United States Patent
Garduno Estebanez et al.

(10) Patent No.: US 11,359,609 B2
(45) Date of Patent: Jun. 14, 2022

(54) ANCHOR CAGE FOR A FOUNDATION OF A WIND TURBINE, ASSEMBLY METHOD THEREOF AND FOUNDATION OF A WIND TURBINE

(71) Applicant: Nordex Energy Spain, S.A.U., Barasoain (ES)

(72) Inventors: Aitor Garduno Estebanez, Barasoain (ES); Gonzalo De Los Rios Leyva, Barasoain (ES); Ivan Garcia Maestre, Barasoain (ES); Teresa Arlaban Gabeiras, Barasoain (ES); Jose Luis Aristegui Lantero, Barasoain (ES); Jose Miguel Garcia Sayes, Barasoain (ES); Miguel Nunez Polo, Barasoain (ES)

(73) Assignee: NORDEX ENERGY SPAIN, S.A.U., Barasoain (ES)

( * ) Notice: Subject to any disclaimer, the term of this patent is extended or adjusted under 35 U.S.C. 154(b) by 0 days.

(21) Appl. No.: 16/695,840

(22) Filed: Nov. 26, 2019

(65) Prior Publication Data
US 2020/0173421 A1    Jun. 4, 2020

(30) Foreign Application Priority Data

Nov. 30, 2018  (EP) .................................... 18382875

(51) Int. Cl.
*F03D 13/20* (2016.01)
*E02D 27/42* (2006.01)

(52) U.S. Cl.
CPC .......... *F03D 13/22* (2016.05); *E02D 27/425* (2013.01); *Y02E 10/728* (2013.01)

(58) Field of Classification Search
CPC ....... F03D 80/50; F03D 13/22; E02D 27/425; Y02E 10/72; Y02E 10/728
See application file for complete search history.

(56) References Cited

U.S. PATENT DOCUMENTS

| 5,826,387 A | 10/1998 | Henderson et al. |
| 9,322,396 B2 * | 4/2016 | Coordes .................. E02D 27/42 |

(Continued)

FOREIGN PATENT DOCUMENTS

| CA | 2876570 C | * | 5/2017 | .............. B21F 27/12 |
| CA | 2931573 C | * | 10/2018 | .............. E04H 12/12 |

(Continued)

*Primary Examiner* — Babajide A Demuren
(74) *Attorney, Agent, or Firm* — Hayes Soloway P.C.

(57) ABSTRACT

Anchor cage for a foundation of a wind turbine. The anchor cage comprises at least an upper load distribution plate (1), at least a lower load distribution plate (2), and a plurality of first reinforcement elements (3) extending between said plates (1, 2). It further comprises at least one intermediate load distribution plate (4) placed between the upper load distribution plate (1) and the lower load distribution plate (2), and a plurality of second reinforcement elements (5) extending between the upper load distribution plate (1) and the intermediate load distribution plate (4), and being shorter than the first reinforcement elements (3). An assembly method for the anchor cage is also described. A foundation is also provided in which the total post-tensioning value provided in the upper part of the foundation (6) is different from the total post-tensioning value provided in the lower part of the foundation (7).

24 Claims, 10 Drawing Sheets

(56) References Cited

U.S. PATENT DOCUMENTS

| | | | |
|---|---|---|---|
| 10,081,964 B2 * | 9/2018 | Martinez Perez-Beato | ................ E04H 12/085 |
| 10,138,615 B2 * | 11/2018 | Kim | ................... E04H 12/2238 |
| 10,214,872 B2 * | 2/2019 | Ollgaard | ................. E02D 27/12 |
| 2007/0065234 A1 * | 3/2007 | Jakubowski | ............ F03D 13/22 405/244 |
| 2008/0190058 A1 * | 8/2008 | Migliore | ................. E02D 27/42 52/295 |
| 2012/0260592 A1 * | 10/2012 | Wolf | ....................... F03D 13/22 52/296 |
| 2014/0318033 A1 * | 10/2014 | Coordes | .................. F03D 13/22 52/40 |
| 2017/0191239 A1 * | 7/2017 | Kim | ........................ E02D 27/42 |
| 2018/0119381 A1 | 5/2018 | Garcia et al. | |

FOREIGN PATENT DOCUMENTS

| | | | | |
|---|---|---|---|---|
| CN | 201705594 U | | 1/2011 | |
| CN | 203755778 U | | 8/2014 | |
| CN | 105002924 A | | 10/2015 | |
| DE | 102004031655 A1 | | 2/2006 | |
| DE | 102011001906 A1 | * | 10/2012 | ............. F03D 13/20 |
| EP | 3495589 A1 | * | 6/2019 | ........... E04H 12/085 |
| WO | 2011047723 A1 | | 4/2011 | |
| WO | WO-2013068403 A1 | * | 5/2013 | ............. E04H 12/34 |
| WO | 2017108043 A1 | | 6/2017 | |

* cited by examiner

STATE OF THE ART

STATE OF THE ART

STATE OF THE ART

ANCHOR CAGE FOR A FOUNDATION OF A WIND TURBINE, ASSEMBLY METHOD THEREOF AND FOUNDATION OF A WIND TURBINE

CROSS-REFERENCE TO RELATED APPLICATIONS AND PRIORITY

This patent application claims priority from EP Patent Application No. 18382875.5 filed Nov. 30, 2018. This patent application is herein incorporated by reference in its entirety.

OBJECT OF THE INVENTION

The present invention describes an anchor cage for a foundation of a wind turbine and the assembly method thereof.

The anchor cage comprises an upper load distribution plate, a lower load distribution plate and first reinforcement elements connecting them. It also comprises second reinforcement elements, shorter than the first reinforcement elements and connected to the upper load distribution plate and to an intermediate distribution plate.

BACKGROUND OF THE INVENTION

The anchor cages are used to connect foundations to steel wind turbine towers. Those anchor cages usually cover the entire height from the lower part of the tower to the lower part of the foundation, where the anchor cage is placed for transmitting the forces from the bolts to the foundation.

When the bolts are post-tensioned, the fatigue behaviour of the bolts is improved, as well as the fatigue behaviour of the foundation's reinforcement subjected to tensile stresses.

In the state of the art it is known document CN 201705594 which discloses a foundation reinforcement cage used for connecting a tower drum and a foundation of a wind generating set. The foundation reinforcement cage consists of an upper connecting pad, a lower connecting pad, an annular cage structure formed by double-end studs arranged between the upper connecting pad and the lower connecting pad, and an adjusting pad assembled on the lower connecting pad.

Document WO 2017108043 discloses a method of forming a wind turbine foundation which includes providing an anchor cage in an excavation pit, the anchor cage including an upper flange, a lower flange, and a plurality of anchor bolts extending therebetween.

It is also known document CN 105002924 which relates to a hollow ground anchor cage base. The base comprises a base main body poured with concrete, a ground anchor cage and a cushion layer both embedded in the concrete, wherein the cushion layer is arranged below the base main body and the ground anchor cage.

DESCRIPTION OF THE INVENTION

The present invention relates to an anchor cage for a foundation of a wind turbine comprising reinforcement elements of different lengths extending between an upper load distribution plate and a lower distribution plate and between the upper load distribution plate and an intermediate distribution plate.

The reinforcement elements connect the upper load distribution plate with the intermediate distribution plate and with the lower distribution plate. When tensioning is applied on the reinforcement elements, placed in the foundation, the concrete of the foundation placed between the load distribution plates is compressed. The reinforcement elements can be bolts or cables.

An essential feature of the invention is that there are reinforcement elements of two different lengths. The longer reinforcement elements, from now on first reinforcement elements, provide a sufficient post-tensioning value (force applied to each reinforcement element) that compresses the concrete of the foundation to improve its resistant behaviour and avoids the cracking of the concrete (avoiding tractions in the concrete upon quasi-permanent loads). They also improve the fatigue behaviour of the foundation's reinforcement. Post-tensioned concrete means that the concrete is poured and then the tension is applied.

The shorter reinforcement elements, from now on second reinforcement elements, only cover the upper part of the anchor cage, adding resistant capacity to the tower-foundation connection. Together with the longer bolts, they are able to withstand extreme loads.

Additionally, each group of reinforcement elements has different post-tensioning values. Once the concrete of the foundation has cured and the tower has been stacked over the foundation, the post-tensioning value applied to the first reinforcement elements need to be higher than the post-tensioning value applied to the second reinforcement elements, due to the first reinforcement elements cover the whole height comprised from the lower surface of the tower to the base of the foundation, helping to compress the concrete of the foundation.

In some embodiments, the lower distribution plate and/or the intermediate distribution plate are approximately half the width of a plate of the traditional anchor cages, so that the resulting material cost of the plates is similar in both cases (in the state of the art and in the present invention).

Another possibility is that each one of the second reinforcement elements (for example short bolts) has associated its own modular (individual) plate instead of being joined to a continuous plate (for example with one ring) for the whole group of reinforcement elements. This solution leads to material savings.

Additionally, the total sum of the length of the reinforcement elements is lower than in the state of the art and since the second reinforcement elements are shorter than the first reinforcement elements, it allows increasing the length of the first reinforcement elements even more, allowing to compress greater foundation heights without raising the cost of the anchor cage.

This new anchor cage is especially advantageous in the case of foundations with high pedestal since the high pedestal allows reducing the necessary height of steel tower and making possible the suppression of the door in the first section of the tower, placing it in the high pedestal itself.

In high pedestals a traditional anchor cage is usually included, however as all the reinforcement elements (usually bolts) cover the whole height comprised from the lower surface of the tower to the base of the foundation the door must necessarily be located in the first section of the tower instead of being placed in the high pedestal itself, increasing the material cost (if the door is placed on the high pedestal, the reinforcement elements prevent entry to the tower).

The use of a double height anchor cage in this type of foundations has associated an important economic advantage, allowing a reduction of the total length of bolts required and making the solution very competitive.

The present invention allows important savings of the material cost in foundation designs with high pedestal, reducing the amount of bolts required by approximately 40%.

First and second reinforcement elements are housed in sheaths.

It is also an object of the invention an assembly method of said anchor cage comprising the following steps:

a) placing a lower load distribution plate on leveling legs lying at the base of a hole in the ground which is meant to be the base of the foundation;

b) joining an end of the first reinforcement elements on the lower load distribution plate;

c) placing an upper load distribution plate over the other end of the first reinforcement elements;

d) joining an end of the second reinforcement elements to the upper load distribution plate and joining the other end of the second reinforcement elements to the intermediate load distribution plate;

e) pouring concrete up to the upper load distribution plate to build the foundation.

It is also provided a foundation comprising the anchor cage, in which, the total post-tensioning value provided in an upper part of the foundation is different from the total post-tensioning value provided in a lower part of the foundation. In a preferred embodiment of the invention, said post-tensioning value in the upper part of the foundation is greater than the total post-tensioning value provided in the lower part of the foundation.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented:

FIG. 13A is the first step of the assembly, and FIG. 13 B is the second and final step of the assembly.

PREFERRED EMBODIMENT OF THE INVENTION

An anchor cage for a foundation of a wind turbine is described and different embodiments of the invention have been depicted in FIGS. 1 to 13.

Figure 1A:
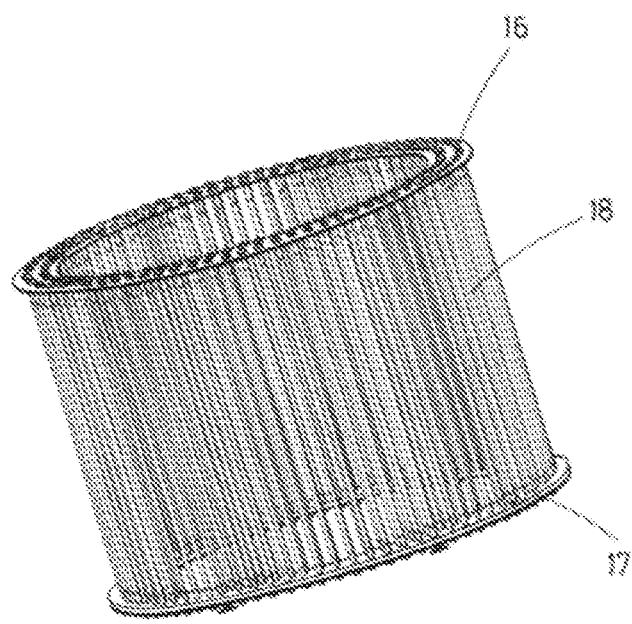
FIGS. 1A-C.—Show an anchor cage of the state of the art and sectional views of anchor cages for foundation with pedestal and with high pedestal respectively.
Figure 1B:
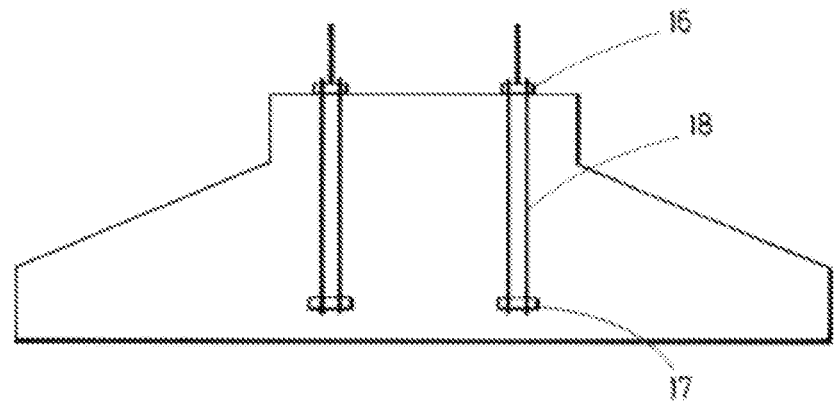
Figure 1C:
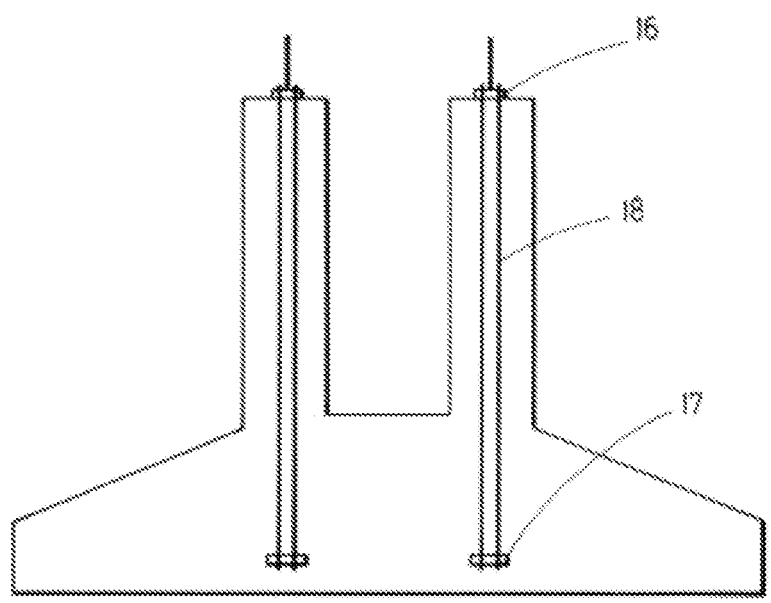

In FIGS. 1A-C two embodiments of state-of-the-art anchor cages are shown. As previously described, known anchor cages for foundations of wind turbines comprise an upper plate, a lower plate, and a plurality of anchor bolts extending therebetween as shown in FIG. 1A. In FIG. 1B it is shown a section of a first embodiment of a foundation with pedestal. In FIG. 1C it is shown a section of a second embodiment of a foundation, in this case with a high pedestal. In both cases an upper plate (16), a lower plate (17) and bolts (18) extending therebetween are shown.

Figure 2A:
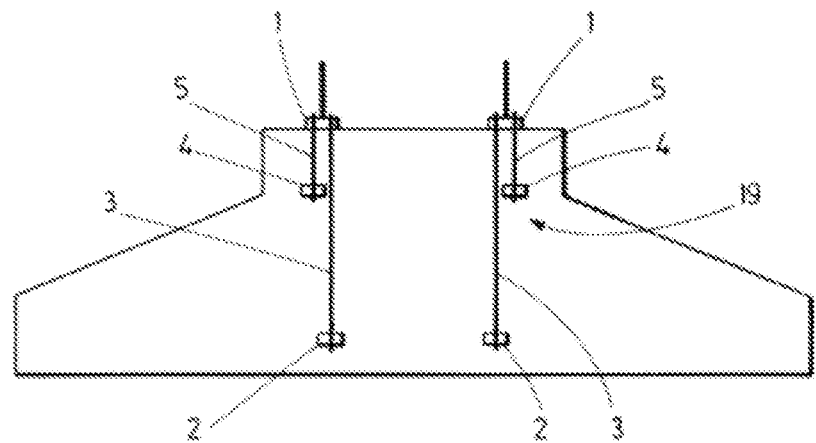
FIGS. 2A-B.—Show sectional views of the present anchor cages for foundation with pedestal and with high pedestal respectively.
Figure 2B:
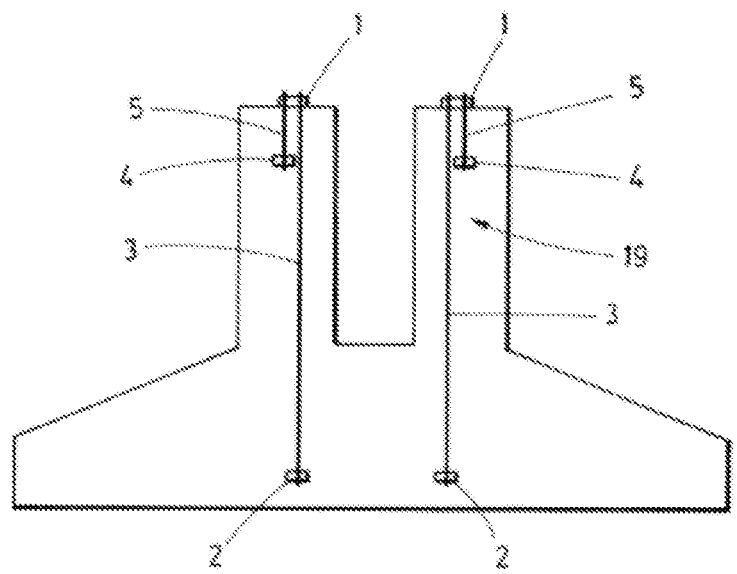

The anchor cage (19) of the present invention can be seen for example in FIGS. 2A and B. It comprises at least an upper load distribution plate (1) and at least a lower load distribution plate (2), and a plurality of first reinforcement elements (3) extending between the upper load distribution plate (1) and the lower load distribution plate (2) and connecting them. The anchor cage (19) further comprises at least one intermediate load distribution plate (4) placed between the upper load distribution plate (1) and the lower load distribution plate (2). It also comprises a plurality of second reinforcement elements (5) extending between the upper load distribution plate (1) and the at least one intermediate distribution plate (4). These second reinforcement elements (5) being shorter than the first reinforcement elements (3).

Figure 3:
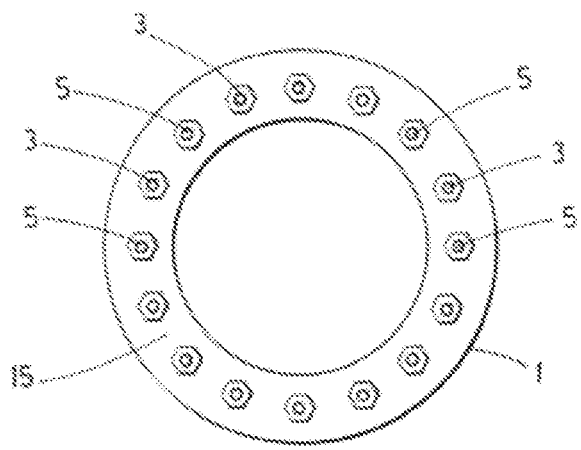
FIG. 3.—Shows an upper view of an anchor cage in an embodiment in which the first reinforcement elements and the second reinforcement elements are distributed alternately and homogeneously forming a same single circumferential row.

In FIG. 3 it is shown an upper view of the upper load distribution plate (1). It is depicted an embodiment of the invention in which the first reinforcement elements (3) and the second reinforcement elements (5) are distributed alternately and homogeneously forming a same single circumferential row (15).

The term "alternately" is referred to form a pattern that is repeated, for example it can be one first reinforcement element (3) followed by a second reinforcement element (5) and so on continuously or other patterns. The term "homogenously" is referred to a distribution where all the reinforcement elements (3,5) are separated by the same distance.

Figure 4:
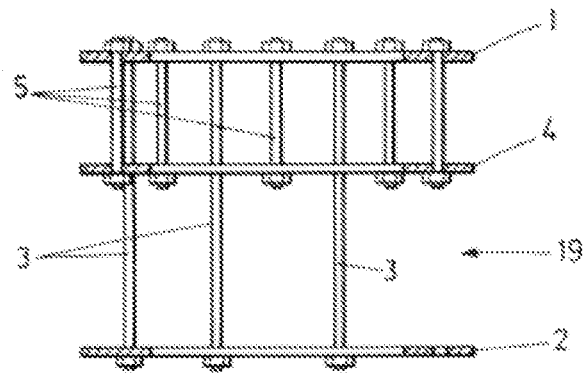
FIG. 4.—Shows a frontal view of the anchor cage of FIG. 3.

In FIG. 4 it is shown a frontal view of the anchor cage (19) of the embodiment of FIG. 3. As can be seen, the first reinforcement elements (3) and the second reinforcement elements (5) are distributed alternately.

Figure 5:
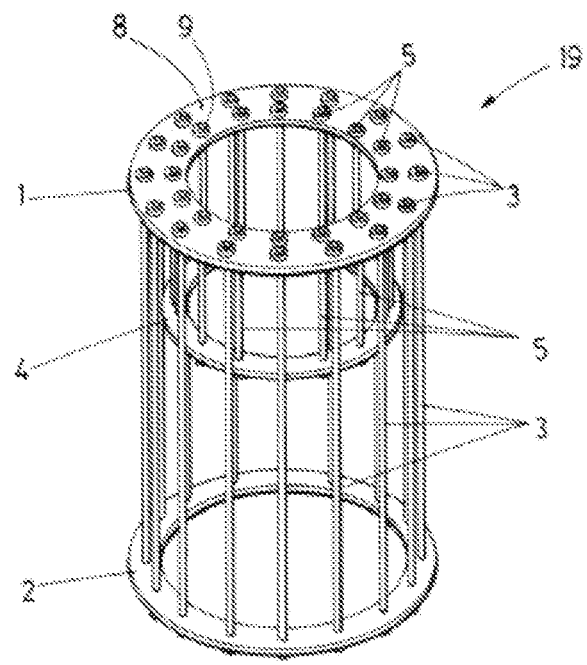
FIG. 5.—Shows a perspective view of an anchor cage in an embodiment in which the first reinforcement elements form a first circumferential row and the second reinforcement elements form a second circumferential row and the diameter of the first circumferential row is larger than the diameter of the second circumferential row.

In another embodiment of the invention, shown in FIG. 5, the first reinforcement elements (3) and the second reinforcement elements (5) are distributed in two separated circumferential rows. In this case, the first reinforcement elements (3) are distributed along a first circumferential row (8) and the second reinforcement elements (5) are distributed along a second circumferential row (9).

Figure 6:
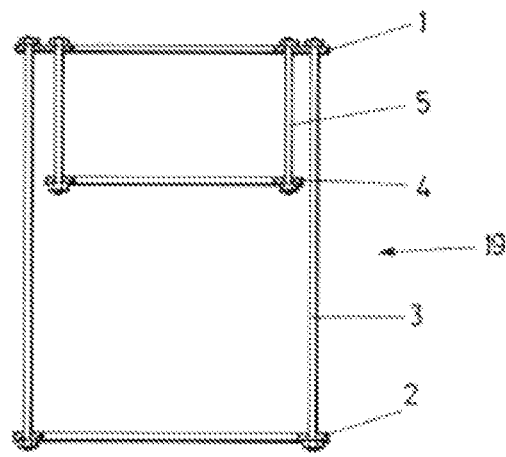
FIG. 6.—Shows a frontal view of the anchor cage of FIG. 5.

In FIG. 6 it is depicted a frontal view of the embodiment shown in FIG. 5. As can be seen in the figure, the second reinforcement elements (5) are placed in the inner part of the anchor cage (19) and the first reinforcement elements (3) are placed in the outer part of the anchor cage (19). The diameter of the first circumferential row (8) is larger than the diameter of the second circumferential row (9).

Figure 7:
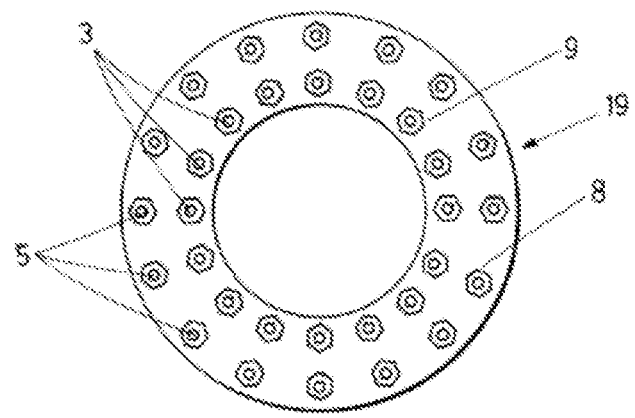
FIG. 7.—Shows an upper view of an anchor cage in an embodiment in which the first reinforcement elements form a second circumferential row and the second reinforcement elements form a first circumferential row.
Figures 8, 9:
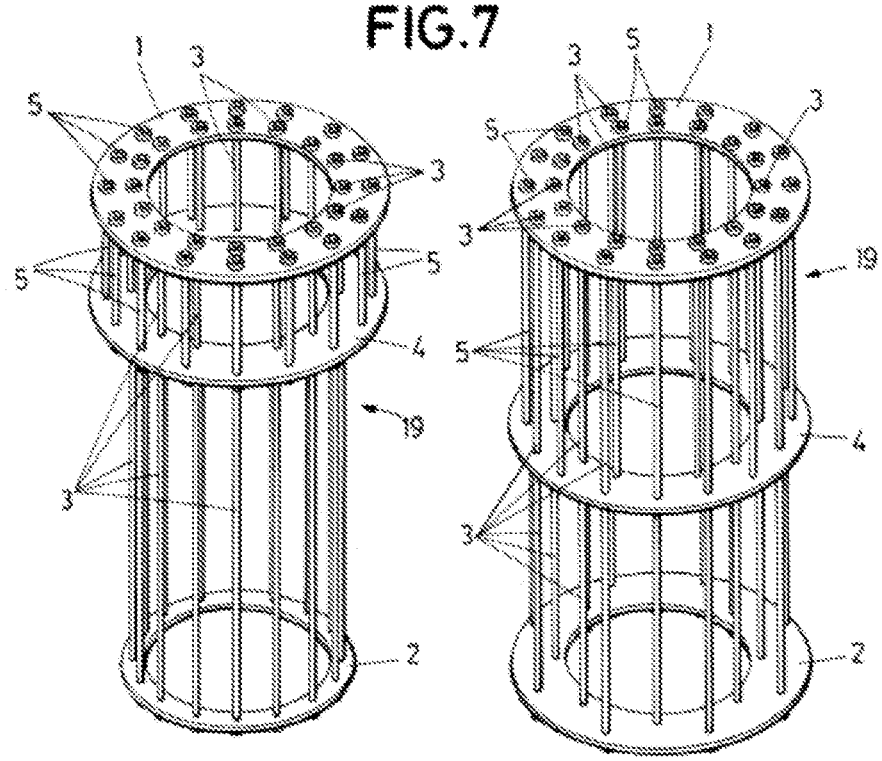
FIG. 8.—Shows a perspective view of the anchor cage of FIG. 7.
FIG. 9.—Shows a perspective view of an anchor cage in an embodiment in which the first reinforcement elements and the second reinforcement elements are distributed alternately and homogeneously along the first circumferential row and the second circumferential row.

In FIG. 7 it is shown another embodiment of the invention in which the second reinforcement elements (5) are placed forming a first circumferential row (8) and the first reinforcement elements (3) are placed forming a second circumferential row (9). The diameter of the first circumferential row (8) is larger than the diameter of the second circumferential row (9). In FIG. 8 it can be appreciated a frontal view of the anchor cage (19) of the embodiment of FIG. 7. The first reinforcement elements (3) are placed in the inner part of the anchor cage (19) and the second reinforcement elements (5) are placed in the outer part of the anchor cage (19).

In another embodiment of the invention, shown in FIG. 9, the first reinforcement elements (3) and the second reinforcement elements (5) are distributed alternately and homogeneously along the first circumferential row and the second circumferential row.

Figure 10A:
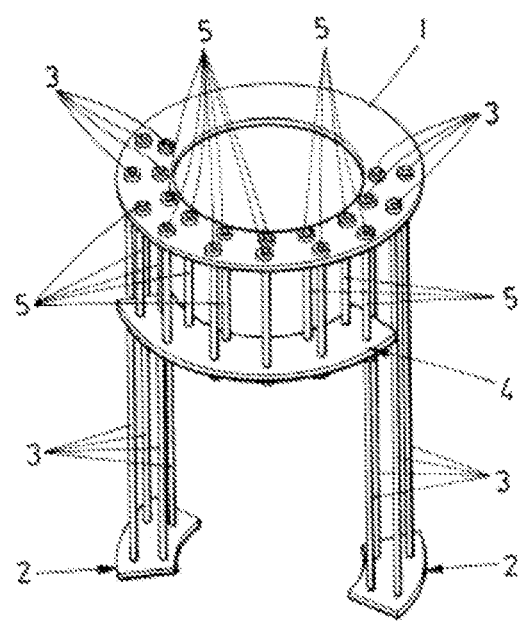
FIG. 10A.—Shows an embodiment wherein the reinforcement elements are distributed in two separated circumferential rows and are combined as follows: two pairs of first reinforcement elements followed by six pairs of second reinforcement elements.

FIG. 10A shows a preferred embodiment wherein the reinforcement elements (3, 5), which are preferably bolts, are distributed in groups. In an embodiment of the invention, the groups are distributed in two separated circumferential rows. Preferably, at least a group is distributed in the following manner: 2 pairs of first reinforcement elements (3) (long bolts) followed by 6 pairs of second reinforcement elements (5) (short bolts). For example it can be 36 first reinforcement elements (3) located from the top of the pedestal to the base of the foundation and 108 second reinforcement elements (5).

This configuration of the anchor cage (19) is especially advantageous in the case of foundations with high pedestal since it makes possible to place the door (12) between two consecutive groups of the first reinforcement elements (3) and below the second reinforcement elements (5). In this way the door (12) can be suppressed from the first section of the tower and placing it in the upper part of the foundation itself. Additionally the high pedestal allows a reduction of the necessary height of steel tower.

Figure 10B:
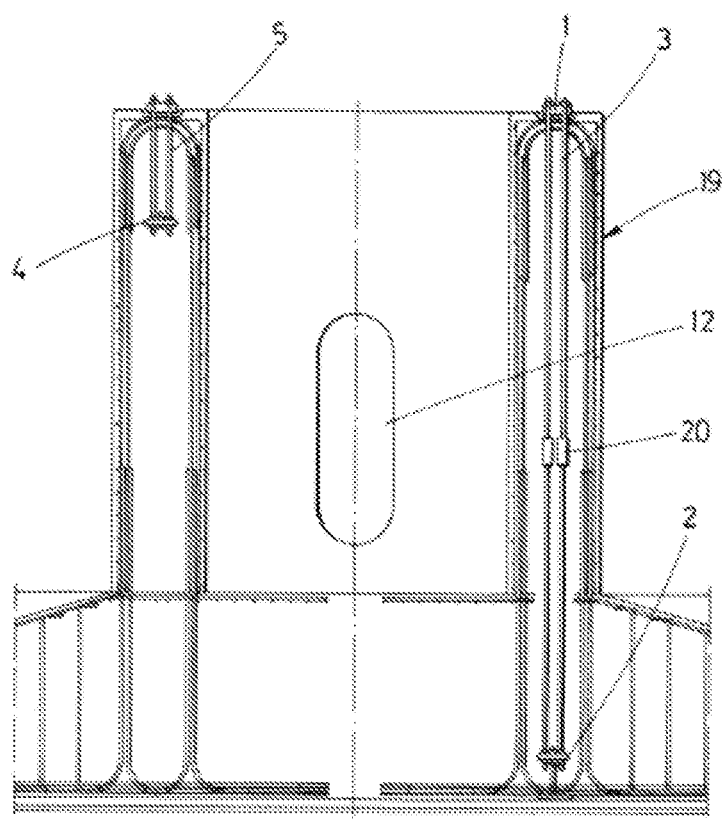
FIG. 10B.—Shows a high pedestal comprising the anchor cage, wherein the first reinforcement elements cover the whole height comprised from the lower surface of the tower to the base of the foundation and the second reinforcement elements and their corresponding intermediate load distribution plate are placed above the door to leave the door free of obstacles.

FIG. 10B shows a sectional view of a foundation with high pedestal comprising the anchor cage (19), wherein the first reinforcement elements (3) (long bolts) cover the whole height comprised from the lower surface of the tower to the base of the foundation, helping to compress the concrete of the foundation, and the second reinforcement elements (5) (short bolts) and their corresponding intermediate load distribution plate (4) are placed above the door (12) to leave the door (12) free of obstacles. The fact of placing the door (12) in the high pedestal instead of placing it in the first section of the tower supposes a high cost saving for the reasons explained above. If the high pedestal is too long, the first reinforcement elements (3) can comprise couplers (20), as shown in said FIG. 10B, in order to obtain first reinforcement elements (3) of enough length.

In FIGS. 5, 8 and 9, there are shown different embodiments in which the intermediate load distribution plate (4) and the at least lower load distribution plate (2) are continuous plates.

Figure 11:
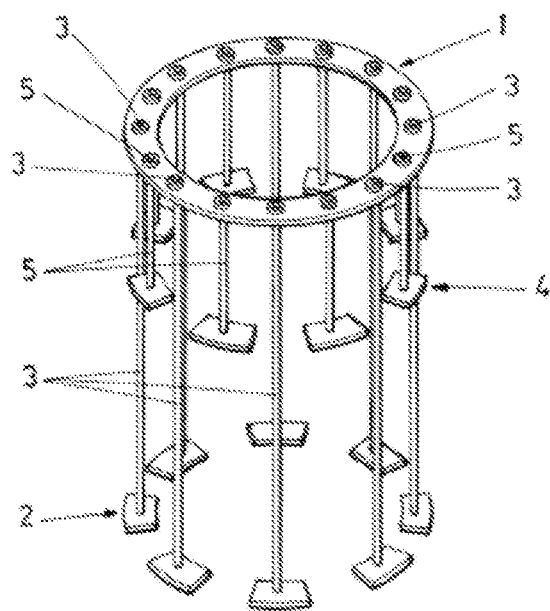
FIG. 11.—Show a view of an embodiment in which the lower load distribution plate and the intermediate load distribution plate comprise a plurality of modular plates for each reinforcement element.

However in FIG. 11 an embodiment is shown in which the load distribution plates (2,4) are modular plates for each reinforcement element (3, 5). Additionally FIG. 10 A shows another embodiment in which the load distribution plates (2, 4) comprise modular plates for a set of reinforcement elements (3, 5).

The upper load distribution plate (1), the lower load distribution plate (2) and the intermediate load distribution plate (4) can be continuous plates made up as a continuous ring or can comprise modules that form a continuous ring.

In a preferred embodiment the post-tensioning value applied to each second reinforcement element (5) is smaller than the post-tensioning value applied to each first reinforcement element (3), since it is not recommended that there is too much post-tensioning value at the upper part of the anchor cage (19). With this anchor cage (19) it is about providing as many connections to the tower as possible (first reinforcement elements (3) and second reinforcement elements (5)) in the upper part of the anchor cage (19) to correctly secure the tower to the foundation, while in the lower part of the anchor cage (19), it is better to have few reinforcement elements (first reinforcement elements (3)) but of maximum post-tensioned, due to the first reinforcement elements (3) are very long, since they cover the whole height comprised from the lower surface of the tower to the base of the foundation, helping to compress the concrete of the foundation. The upper part of the anchor cage (19) is considered to be from the intermediate load distribution plate (4) until the upper load distribution plate (1), and the lower part of the anchor cage (19) is considered to be from the lower load distribution plate (2) until the intermediate load distribution plate (4).

All the first reinforcement elements (3) have the same post-tensioning value. All the second reinforcement elements (5) have the same post-tensioning value.

In another embodiment the post-tensioning value applied to the first and second reinforcement elements (3,5) can be the same.

In another embodiment the total post-tensioning value (the sum of the post-tensioning values applied to each reinforcement element) provided in the upper part of the anchor cage (19) is greater than the total post-tensioning value provided in the lower part of the anchor cage (19), as to the upper part is subjected to the post-tensioning value applied to the first and second reinforcement elements (3,5) while the lowest part is only subjected to the post-tensioning value applied to the first reinforcement elements (3).

The width of each load distribution plate (1, 2, 4) and the diameter of the reinforcement elements (3, 5) can be adapted to different measures and weights of the foundation and/or wind turbine towers. In an embodiment of the invention, a width of the at least intermediate load distribution plate (4)

and/or a width of the at least lower load distribution plate (2) are less than a width of the at least upper load distribution plate (1).

In a preferred embodiment of the invention, the second reinforcement elements (5) have a minimum length of 0.8 meters and a maximum length substantially equal to 2 meters. Generally, the greater the length of the second reinforcements elements (5), the better the concrete will behave, but it has been verified that starting from a determined maximum length, such as 2 meters, the behaviour of the concrete does not improve, so it does not make sense to increase the length of the second reinforcement elements (5), saving material in this way.

The minimum and maximum length of the second reinforcement elements (5) will depend on: the number of reinforcement elements, the fatigue loads, the properties of the concrete and the properties of the reinforcement elements, the post-tensioning loads, etc.

Preferably, the reinforcement elements (3,5) are selected between bolts, cables or a combination thereof.

Obviously, the number of second reinforcement elements (5) may be different from the number of first reinforcement elements (3) or it can be equal.

The at least intermediate load distribution plate (4) and the at least lower load distribution plate (2) are selected between a continuous plate and modular plates for each reinforcement element (3, 5) or set of reinforcement elements (3, 5).

It is also an object of the invention an assembly method of the described anchor cage (19) in a foundation with pedestal. The method comprises the following steps:

a) placing at least a lower load distribution plate (2) on leveling legs (10) lying at the base of a hole in the ground which is meant to be the base (11) of the foundation;

b) joining an end of the first reinforcement elements (3) on the at least lower load distribution plate (2);

c) placing at least the upper load distribution plate (1) over the other end of the first reinforcement elements (3);

d) joining an end of the second reinforcement elements (5) to the at least upper load distribution plate (1) and left the second reinforcement elements (5) hanging from said at least upper load distribution plate (1); the other ends of the second reinforcement elements (5) are joined to the at least intermediate load distribution plate (4);

e) pouring concrete up to the at least upper load distribution plate (1) to build the foundation.

Figure 12:
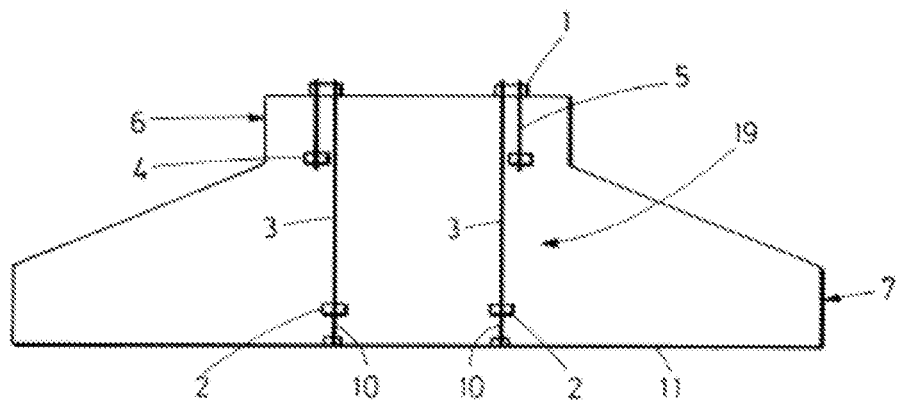
FIG. 12.—Shows a sectional view of a foundation with pedestal comprising the anchor cage to illustrate the steps of the assembly method.

In FIG. 12 can be appreciated the leveling legs (10) and the elements of the anchor cage (19).

In another embodiment of the invention, in which the foundation with the anchor cage (19) is a foundation with a high pedestal, the assembly method comprises additionally the following sub-steps which are performed after step b) (joining an end of the first reinforcement elements (3) on the at least lower load distribution plate (2)) and before step c) (placing the at least upper load distribution plate (1) over the other end of the first reinforcement elements (3)):

b1) placing a temporal template (13) at a certain height of the first reinforcement elements (3);

b2) pouring concrete up to the template (13) to build a lower part of the foundation (7), leaving the leveling legs (10) embedded in the concrete, b3) removing the template (13).

In an embodiment of the invention, step d) of the method can be previous to step c), specifically when the at least intermediate load distribution plate (4) is a continuous plate. In this case, in step d) an assembly formed by the second reinforcement elements (5), the at least upper load distribution plate (1) and the at least intermediate load distribution plate (4) can be mounted outside of the hole of the foundation.

Also according to this embodiment of the invention, once the assembly (the second reinforcement elements (5), the at least upper load distribution plate (1) and the at least intermediate load distribution plate (4)) has been mounted, the at least upper load distribution plate (1) is joined to the other end of the first reinforcement elements (3) such that the second reinforcement elements (5) and the at least intermediate load distribution plate (4) remain hanging from the at least upper load distribution plate (1). For mounting the assembly over the first reinforcement elements (3) it is only necessary to introduce the at least intermediate load distribution plate (4), comprising a plurality of orifices, into the first reinforcement elements (3) (each orifice in correspondence with a first reinforcement element). This step finishes the assembly of the anchor cage (19).

Additionally, once the lower part of the foundation (7) has been concreted (and cured) it is possible placing a formwork (14) over it, later the at least upper load distribution plate (1) can be anchored to the formwork (14) to ensure the stability of the anchor cage (19) and avoid the failure by buckling of the first reinforcement elements (3).

Figure 13A:
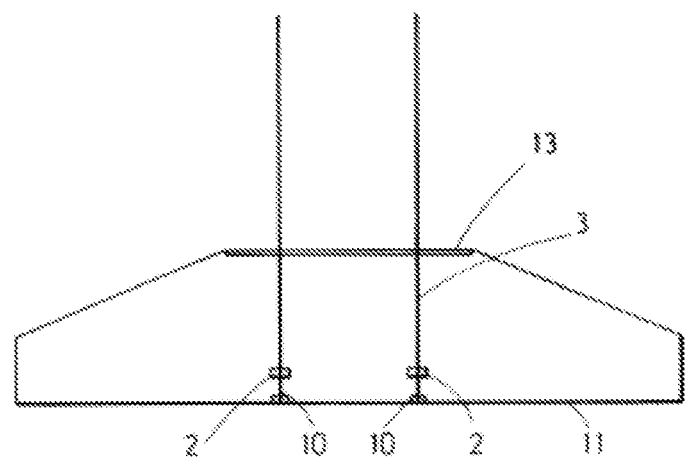
FIGS. 13A-B.—Show a sectional view of a foundation with a high pedestal comprising the anchor cage to illustrate the steps of the assembly method.
Figure 13B:
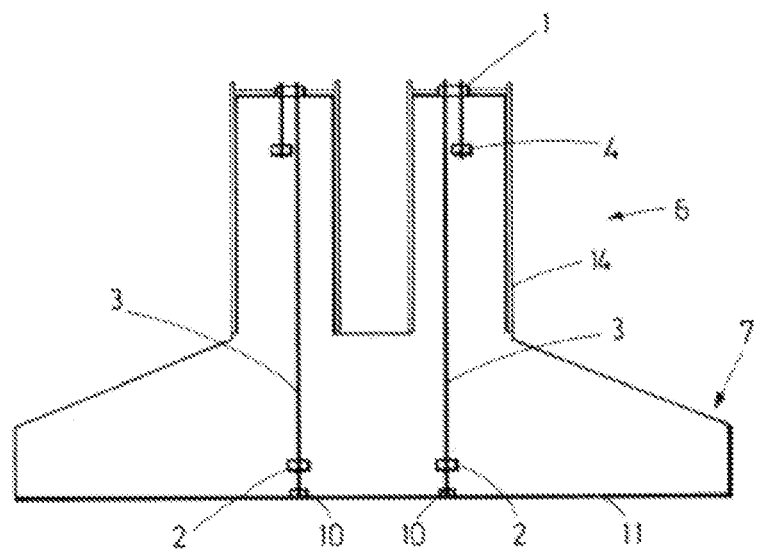

These steps can be seen in FIGS. 13A-B. In FIG. 13A it can be seen the lower part of the foundation (7) with the leveling legs (10) and first reinforcement elements (3). In FIG. 13B it can be seen the formwork (14) for the upper part of the foundation (6) and the second reinforcement elements (5).

The method further comprises applying a post-tensioning value to the reinforcement elements (3, 5), once the concrete of the foundation has cured and the tower has been stacked over the foundation.

In the case that the at least lower load distribution plate (2) comprises modular plates for each reinforcement element (3, 5) or set of reinforcement elements (3, 5) or comprise modules that form a continuous ring it would be necessary to use additional tools for placing the at least lower load distribution plate (2) on the leveling legs (10).

In both methods the anchor cage (19) and the leveling legs (10) remain embedded in the concrete.

It is also an object of the present invention a foundation (6) comprising the described anchor cage (19). The essential feature of the foundation is that the total post-tensioning value provided in the upper part of the foundation (6) is different from the total post-tensioning value provided in the lower part of the foundation (7).

Preferably, the total post-tensioning value provided in the upper part of the foundation (6) is greater than the total post-tensioning value provided in the lower part of the foundation (7).

The invention claimed is:

1. An anchor cage for a foundation of a wind turbine that comprises at least an upper load distribution plate, at least a lower load distribution plate, and a plurality of first reinforcement elements extending between the at least upper load distribution plate and the at least lower load distribution plate, further comprising at least one intermediate load distribution plate placed between the upper load distribution plate and the lower load distribution plate, and a plurality of second reinforcement elements extending between the at least upper load distribution plate and the at least one intermediate load distribution plate, wherein the second reinforcement elements are shorter than the first reinforcement elements and the second reinforcement elements are at least partially placed in the foundation.

2. The anchor cage for a foundation of a wind turbine of claim 1 wherein the first reinforcement elements and the second reinforcement elements are distributed along a single circumferential row.

3. The anchor cage for a foundation of a wind turbine of claim 2 wherein the first reinforcement elements and the second reinforcement elements are distributed alternately along the single circumferential row.

4. The anchor cage for a foundation of a wind turbine of claim 1 wherein the first reinforcement elements and the second reinforcement elements are distributed along two circumferential rows: a first circumferential row and a second circumferential row wherein the diameter of the first circumferential row is larger than the diameter of the second circumferential row.

5. The anchor cage for a foundation of a wind turbine of claim 4 wherein the first reinforcement elements and the second reinforcement elements are distributed according to a configuration in which the first reinforcement elements are distributed along the first circumferential row and the second reinforcement elements are distributed along the second circumferential row or according to a configuration in which the first reinforcement elements are distributed along the second circumferential row and the second reinforcement elements are distributed along the first circumferential row.

6. The anchor cage for a foundation of a wind turbine of claim 5 wherein a width of the at least intermediate load distribution plate and/or a width of the at least lower load distribution plate are less than a width of the at least upper load distribution plate.

7. The anchor cage for a foundation of a wind turbine of claim 4 wherein the first reinforcement elements and the second reinforcement elements are distributed alternately along the first circumferential row and the second circumferential row.

8. The anchor cage for a foundation of a wind turbine of claim 7 characterized in that the first reinforcement elements and the second reinforcement elements are equally distributed along the first circumferential row and the second circumferential row.

9. The anchor cage for a foundation of a wind turbine of claim 8 wherein the reinforcement elements are distributed in groups, wherein at least a group is distributed in the following manner: 2 pairs of first reinforcement elements followed by 6 pairs of second reinforcement elements.

10. The anchor cage for a foundation of a wind turbine of claim 1 wherein a post-tensioning value applied to each second reinforcement element is smaller than the post-tensioning value applied to each first reinforcement element.

11. The anchor cage for a foundation of a wind turbine of claim 10 wherein the total post-tensioning value provided in an upper part of the anchor cage is greater than the total post-tensioning value provided in a lower part of the anchor cage.

12. The anchor cage for a foundation of a wind turbine of claim 1 wherein the at least intermediate load distribution plate and the at least lower load distribution plate are selected between a continuous plate and/or modular plates for each reinforcement element or set of reinforcement elements.

13. The anchor cage for a foundation of a wind turbine of claim 1 wherein the first reinforcement elements and the second reinforcement elements are distributed homogeneously.

14. The assembly method of a foundation comprising the anchor cage of claim 1, the assembly method comprising the following steps:

a) placing at least a lower load distribution plate on leveling legs lying at the base of a hole in the ground which is meant to be the base of the foundation;
b) joining an end of the first reinforcement elements on the at least lower load distribution plate;
c) placing the at least upper load distribution plate over the other end of the first reinforcement elements;
d) joining an end of the second reinforcement elements to the at least upper load distribution plate and joining the other end of the second reinforcement elements to the at least intermediate load distribution plate;
e) pouring concrete up to the at least upper load distribution plate to build the foundation.

15. The assembly method of claim 14, further comprising the following sub-steps between steps b) and c):
b1) placing a template at a certain height of the first reinforcement elements;
b2) pouring concrete up to the template to build a lower part of the foundation;
b3) removing the template.

16. The assembly method of claim 14, characterized in that step d) precedes step c).

17. The assembly method according to claim 16, wherein in step d) an assembly formed by the second reinforcement elements, the at least upper load distribution plate and the at least intermediate load distribution plate is mounted outside of the hole of the foundation.

18. The assembly method of claim 17, wherein once the assembly has been mounted, the at least upper load distribution plate is joined to the other end of the first reinforcement elements such that the second reinforcement elements and the at least intermediate load distribution plate remain hanging from the at least upper load distribution plate.

19. The assembly method of claim 15 wherein further comprises placing a formwork over the lower part of the foundation once the lower part of the foundation has been concreted and anchoring the at least upper load distribution plate to the formwork (14) to ensure the stability of the anchor cage.

20. The foundation of a wind turbine that comprises the anchor cage described in claim 1 wherein a total post-tensioning value provided in an upper part of the foundation is different from a total post-tensioning value provided in a lower part of the foundation.

21. The foundation of a wind turbine of claim 20 wherein the total post-tensioning value provided in the upper part of the foundation is greater than the total post-tensioning value provided in the lower part of the foundation.

22. The anchor cage for a foundation of a wind turbine of claim 1 wherein the plurality of second reinforcement elements extending between the at least upper load distribution plate and the at least one intermediate load distribution plate is placed in the foundation.

23. The anchor cage for a foundation of a wind turbine of claim 1 wherein the second reinforcement elements of the plurality of second reinforcement elements extending between the at least upper load distribution plate and the at least one intermediate load distribution plate are tensioned reinforcement elements.

24. The anchor cage for a foundation of a wind turbine of claim 1 wherein the plurality of first reinforcement elements extending between the at least upper load distribution plate and the at least lower load distribution plate connects the at least upper load distribution plate and the at least lower load distribution plate.

* * * * *